United States Patent [19] [11] 4,240,082
Yu [45] Dec. 16, 1980

[54] MOMENTUMLESS SHUTDOWN OF A JET DROP RECORDER

[75] Inventor: James H. Yu, Spring Valley, Ohio
[73] Assignee: The Mead Corporation, Dayton, Ohio

[21] Appl. No.: 15,887
[22] Filed: Feb. 28, 1979
[51] Int. Cl.[3] .......... G01D 15/18
[52] U.S. Cl. .......... 346/75; 346/140 R
[58] Field of Search .......... 346/75, 140 R

[56] References Cited

U.S. PATENT DOCUMENTS

| | | | |
|---|---|---|---|
| 2,650,003 | 8/1953 | Coleman . | |
| 2,721,008 | 10/1955 | Morgan . | |
| 3,661,304 | 5/1972 | Martinez et al. | 346/75 X |
| 3,719,952 | 3/1973 | Elbaum | 346/140 X |
| 3,891,121 | 6/1975 | Stoneburner | 346/75 X |
| 3,970,222 | 7/1976 | Duffield | 346/75 X |
| 4,031,561 | 6/1977 | Paranjpe | 346/75 X |
| 4,042,937 | 8/1977 | Perry et al. | 346/75 X |

OTHER PUBLICATIONS

Helinski, E. F., Start Up/Turn Off System For Ink Jet Printer, IBM Tech. Disc. Bulletin, vol. 17, No. 2, pp. 370–371, Jul. 1974.

*Primary Examiner*—George H. Miller, Jr.
*Attorney, Agent, or Firm*—Biebel, French & Nauman

[57] ABSTRACT

A method and apparatus for terminating the flow of liquid coating material from a jet drop recording device without splattering or seepage is provided. A supply of coating material under pressure is pumped through an inlet valve to a manifold in the printing head of the device. Shutdown is initiated by closing the inlet valve, terminating the supply of coating material. When the pressure in the manifold has dropped to the minimum required for normal operation of the recording device, an outlet valve connecting the manifold to a source of vacuum is opened, rapidly reducing the pressure in the manifold to atmospheric and terminating the flow of coating material from the printing head. A control unit is provided to open and close the valves and monitor the pressure inside the manifold to insure proper sequencing during the shutdown procedure.

10 Claims, 3 Drawing Figures

MOMENTUMLESS SHUTDOWN OF A JET DROP RECORDER

BACKGROUND OF THE INVENTION

This invention relates to jet drop recording devices, and more particularly to the problems associated with terminating operation of the printing head in such devices upon completion of the desired amount of printing.

These jet drop recording devices utilize a liquid coating material, such as ink, which is pumped under pressure to a manifold communicating with a series of small diameter orifices as taught by Beam, U.S. Pat. No. 3,577,198, and Mathis, U.S. Pat. No. 3,701,998. As the coating material is ejected through the orifices under pressure, it forms fine filaments of coating material which then break down into a series of discrete drops. At the point where the drops break from the filaments they pass through charging electrodes which, depending on the pattern of coating material desired on a receiving member conveyed beneath the drop generator, either charge or do not charge each drop of coating material.

An electrostatic deflecting field is set up downstream of the charge rings and all drops which receive a charge while passing through the charge rings are deflected from their trajectory by the deflecting field. A catcher is also associated with the system to catch those drops which it is desired to prevent from reaching the receiving member. Thus, by applying suitable charging signals to the drops, a visible, human readable record may be formed on the recording medium.

As can be appreciated, the problem of splattering of the coating material on system components is critical because multi-jet ink recording systems of this type require that the streams of drops be closely spaced. This in turn requires closely spaced orifices and closely spaced charge electrodes. With such closely spaced drop streams, it is difficult to maintain the closely spaced system components free of ink, which is electrically conductive and can cause shorting and other electrical problems. Additionally, evaporation of the ink leaves a residue on the system components which may build up and eventually affect operation.

These problems are especially difficult to remedy during startup and shutdown of jet drop recording devices. For example, if during startup the flow of ink to the drop generator is commenced by simply opening a supply line to the manifold, it will require a finite time period before normal operating pressure is reached. During that time, ink will initially weep from each orifice and form pendulous masses of material along the bottom of the orifice plate. As pressure increases inside the manifold, uncontrolled jets of ink will finally be expelled from the orifices, stabilizing only after the excess ink along the underside of the orifice plate is carried away by entrainment with the jets.

At shutdown, the opposite problem occurs. If the ink supply to the manifold is merely turned off, pressure will gradually decrease collapsing the flowing jets of ink and concluding with the dribbling of ink from the orifices. Obviously, ink spattering will occur which can cause electrical shorts, burnouts, and residue buildup on parts. Various efforts have been made in the prior art to solve this shutdown problem. Examples are Culp, U.S. Pat. No. 3,618,858, who teaches use of open-sided charge electrodes which are moved out of the way during startup and shutdown, and Stoneburner, U.S. Pat. No. 3,891,121, and Perry et al, U.S. Pat. No. 4,042,937, who teach simultaneously closing the fluid supply inlet valve to the ink manifold and opening an outlet valve from the manifold to a vacuum source.

However, none of the prior art shutdown methods have proved entirely satisfactory. Use of movable charge electrodes adds to the complexity of the recording device, while closing the fluid supply inlet and simultaneously opening the ink supply manifold to a vacuum source results in pressure oscillations in the manifold and tends to cause air and other contaminants to be sucked into the ink supply. This necessitates the addition of purging procedures to remove the air and contaminants at a later time.

The problem of achieving clean shutdown is especially acute in the office copier environment where ink is maintained in the manifold at all times to permit rapid startup of the jet recording device. The necessity of a purging or cleaning procedure prior to each startup greatly increases the startup time for each copying cycle and is highly undesirable. Accordingly, the need still exists in the art for a simple shutdown procedure which will prevent splattering of ink and yet keep out air and other conteminants from the ink supply.

SUMMARY OF THE INVENTION

In accordance with the present invention, there is provided an ink jet recording device including an ink jet image bar containing an ink manifold and a multi-jet orifice plate. An ink supply under pressure is connected to the manifold through an inlet valve. At the outlet end of the manifold, a second valve connects the manifold to a source of vacuum. A control unit is also provided to sequence properly the opening and closing of the valves.

During operation of the ink jet recorder, the inlet valve to the manifold is open while the outlet side valve is closed. At shutdown, the inlet valve to the manifold is closed, and the pressure inside the manifold begins to drop. This pressure drop is monitored by the control unit until it reaches a point just above the minimum operating pressure required to maintain proper jet drop stream straightness. At that point, the outlet valve is opened to a source of vacuum which causes rapid termination of ink flow through the orifices and results in a clean shutdown.

Accordingly, it is an object of this invention to provide a simple and reliable means and method to assure clean shutdown of an ink jet recording device. This and other objects and advantages of the invention will become apparent from the following description, the accompanying drawings, and the appended claims.

DESCRIPTION OF THE PREFERRED EMBODIMENTS

Figure 1:
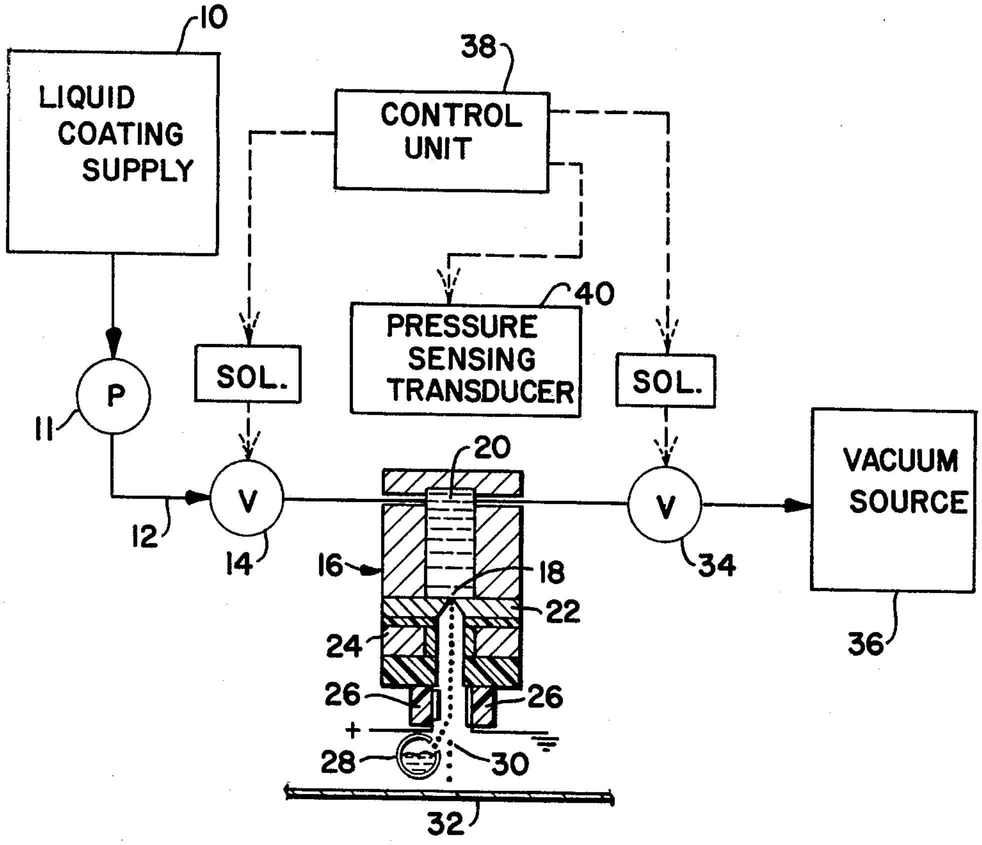
FIG. 1 is a schematic diagram of a typical jet drop coating device together with the control unit and inlet and outlet valves.

As shown in FIG. 1, a liquid coating material such as ink is supplied from reservoir 10 by pump 11 through line 12 and inlet valve 14 to recording head 16. Recording head 16, shown schematically for ease of understanding, is preferably of laminar construction as generally taught by Beam, U.S. Pat. No. 3,586,907, and produces an array of longitudinally spaced jets. If desired, the recording head may produce an array of jets arranged in two parallel rows as taught by Mathis, U.S. Pat. No. 3,701,998. Typically, orifices 18 in recording head 16 will have diameters of from about 0.02 mm to 0.05 mm and will be spaced on approximately 0.5 mm centers or less.

The primary elements of recording head 16 are a liquid coating supply manifold 20, orifice plate 22, charge ring plate 24, deflection electrodes 26, and catcher 28. The ink in manifold 20 will flow under the pressure produced by pump 11 through orifices 18 to form a row of streams of drops 30. The undeflected drops are then printed in a human-readable pattern on web 32. A positive pressure in manifold 20 is required for ink flow through orifices 18.

An outlet valve 34 connects the outlet of manifold 20 with a source of vacuum 36. Outlet valve 34 as well as inlet valve 14 are preferably solenoid valves operated by electrical signals from control unit 38. In a preferred embodiment, a pressure sensing transducer 40 is also connected to manifold 20 to sense any pressure changes therein. Transducer 40 is also in electrical connection with control unit 38.

During normal operation of the recorder, coating material such as ink will be supplied to manifold 20 at a pressure of about 30 psi above atmospheric (all references to pressure will be with respect to atmospheric). This normal operating pressure may vary somewhat depending on the viscosity of the particular coating material used and the diameter and configuration of the orifices in the orifice plate. However, for typical aqueous based jet printing inks having viscosities of from 1 to 3 centipoise and orifices having 0.85 to 2.0 mil diameters, operating pressures of from 12 to 30 psi will provide satisfactory jet stream straightness.

Figure 2A:
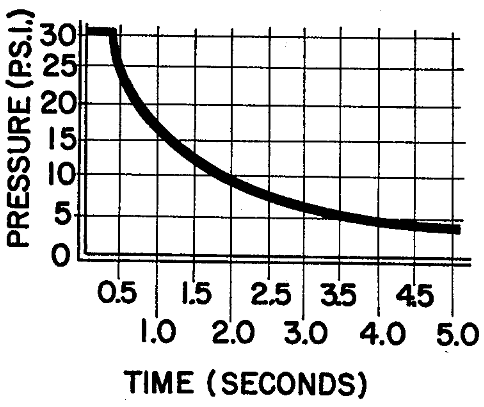
FIGS. 2*a* and 2*b* are graphs of pressure drop versus time in the manifold of a jet drop coating device.

To initiate shutdown of the recording device, control unit 38 sends out an electrical signal which causes inlet valve 14 to close. Straight streams of drops of ink will continue to be expelled from the orifices as the pressure in manifold 20 falls. As shown in FIG. 2*a*, when the inlet valve is closed, pressure in the supply manifold will drop over a period of several seconds until it essentially reaches atmospheric. However, at some point during shutdown the pressure in the manifold will drop below the minimum pressure necessary to maintain jet stream straightness. For a typical aqueous-based jet printing ink this will be about 8 to 10 psi. If nothing further is done, when the pressure in the manifold drops below that minimum, the jet streams will become erratic and splatter ink on the components of the recording device.

Figure 2B:
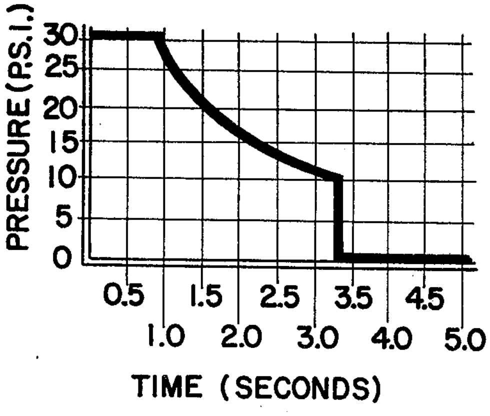

This splattering problem is solved, however, if at or slightly above this minimum operating pressure, control unit 38 opens outlet valve 34 to vacuum source 36. As shown in FIG. 2*b*, exposure of the manifold to a vacuum source essentially instantaneously drops the pressure therein to atmospheric. Because of the surface tension of the coating material and the smallness of the orifices, ink flow out of the orifices will immediately terminate, resulting in a clean shutdown.

It has been found that only a slight vacuum need be pulled to achieve this result. For typical aqueous-based jet printing inks, a vacuum of only 0.2 to 0.8 psi below atmospheric will yield excellent results. If a higher vacuum is pulled, air and other contaminants tend to be sucked into the manifold, while use of lesser vacuum levels results in some seepage of material from the orifices. Of course, the viscosity of the coating material and sizes of the orifices utilized will have an effect on the optimum amount of vacuum required.

The control unit may be equipped with a simple timing mechanism which will activate the opening of outlet valve 34 a predetermined amount of time after inlet valve 14 has been closed. The timing can be adjusted depending on the particular coating material used. The time required to reduce to the minimum pressure for maintaining jet straightness will vary and depends on the characteristics of the coating material, valves, and volume of the manifold. A smaller ink manifold reduces the time as does the use of plunger-type solenoid valves. Thus, the total time may vary from the 2.5 seconds shown in FIG. 2*b* to as little as 0.05 seconds. However, in a preferred embodiment, a pressure sensing transducer 40 detects the pressure in manifold 20 enabling control unit 38 to cause outlet valve 34 to open when the pressure in the manifold is at or slightly above the minimum pressure required for maintaining jet stream straightness. Again, the control unit may be adjusted for the particular coating material and orifice size used in the recording device.

While the apparatus and methods herein described constitute preferred embodiments of the invention, it is to be understood that the invention is not limited to these precise methods and apparatus, and that changes may be made therein in either without departing from the scope of the invention, which is defined in the appended claims.

What is claimed is:

1. In a jet drop coating system comprising a coating head provided with a plurality of orifices and a manifold for delivery of liquid coating material to said orifices, improved momentumless shutdown apparatus comprising:

an inlet in said coating head, an inlet valve means connected to said inlet, an outlet in said coating head, an outlet valve means connected to said outlet, a source of vacuum connected to said outlet valve means, and controller means, in electrical connection with said inlet valve means, said outlet valve means, and said manifold, for closing said inlet valve means and opening said outlet valve means at a point when the pressure in said manifold is slightly above the minimum pressure required to maintain jet straightness.

2. The apparatus of claim 1 where said inlet and outlet valves are solenoid valves.

3. The apparatus of claim 1 where said controller means includes pressure sensing transducer means for sensing the pressure drop in said manifold.

4. The apparatus of claim 1 where said controller means includes preset timing means activated by the closing of said inlet valve means for determining when to open said outlet valve means.

5. The apparatus of claims 3 or 4 where said source of vacuum is at 0.2 to 0.8 psi below ambient air pressure.

6. A method of shutting down an ink jet coating device having a coating head connected to a supply of coating material under pressure, with a plurality of orifices, a manifold for delivery of liquid coating material to said orifices, and inlet valve and an outlet valve connected to a source of vacuum, comprising the steps of:

closing said inlet valve, and opening said outlet valve to said source of vacuum at a point when the pressure in said manifold is slightly above the minimum pressure necessary to sustain normal operation.

7. The method of claim 6 including the step of sensing the pressure drop in said manifold.

8. The method of claim 7 where the source of vacuum is at 0.2 to 0.8 psi below ambient air pressure.

9. The method of claim 8 where said minimum pressure necessary to sustain normal operation is 8 pounds per square inch.

10. The method of claim 9 where said outlet valve is opened from about 0.05 to 2.5 seconds after said inlet valve is closed, depending on the characteristics of the system.

* * * * *